United States Patent [19]
Arndt

[11] Patent Number: 4,481,687
[45] Date of Patent: Nov. 13, 1984

[54] DEVICE FOR CLEANING BEE HIVE FRAMES

[76] Inventor: Maurice W. Arndt, 116 11th St., SE., Altoona, Iowa 50009

[21] Appl. No.: 532,314

[22] Filed: Sep. 15, 1983

[51] Int. Cl.³ .............................................. A01K 51/00
[52] U.S. Cl. ...................................................... 6/12 R
[58] Field of Search ..................... 6/12 R, 12 A, 12 M

[56] References Cited

U.S. PATENT DOCUMENTS

| | | | |
|---|---|---|---|
| 1,615,158 | 1/1927 | Bergquist | 6/12 R |
| 1,850,100 | 3/1932 | Gall | 6/12 R |
| 2,248,867 | 7/1941 | Hallman, Sr. | 6/12 R |
| 2,248,893 | 7/1941 | Parent | 6/12 R |
| 4,308,447 | 12/1981 | Nötzold et al. | 219/421 |

FOREIGN PATENT DOCUMENTS

| | | | |
|---|---|---|---|
| 70082 | 10/1915 | Austria | 6/12 R |
| 2144130 | 3/1973 | Fed. Rep. of Germany | 6/12 A |
| 197942 | 1/1924 | United Kingdom | 6/12 R |

*Primary Examiner*—Robert P. Swiatek
*Attorney, Agent, or Firm*—Zarley, McKee, Thomte, Voorhees & Sease

[57] ABSTRACT

The device of the present invention comprises an insulated box, having a drain opening in its bottom wall. Within the box is a ramp wall which is inclined and which divides the interior of the box into upper and lower portions. The ramp wall is inclined downwardly toward the drain opening. A drain extends through the lower end of the ramp wall and through the drain opening. Hangers are provided above the ramp wall for suspending a plurality of bee hive frames above the ramp wall. A heating element within the compartment heats the air to a temperature at least sufficient to melt the wax on the frames so that the wax will melt and run down the ramp wall and out through the drain.

10 Claims, 6 Drawing Figures

DEVICE FOR CLEANING BEE HIVE FRAMES

BACKGROUND OF THE INVENTION

This invention relates to a device for cleaning the frames used within bee hives. The collection of honey within bee hives is usually accomplished by means of a plurality of rectangular frames having a flat sheet of wax or wax covered plastic therein. The bees build the honey combs on the sheet, and after the honey comb is complete the bee keeper removes the frames and removes the honey from the frames.

One problem encountered in this process is the necessity for cleaning and sterilizing the bee frames before they are recycled back into the hive for reuse. The honey comb must be removed from the frames and the bee's wax must also be removed. Furthermore, a number of contaminants are often left on the frames after usage, and these contaminants must also be removed.

Sterilizing and removing impurities from the frames is important in order to maintain a healthy hive of bees. Diseases such as "foul brood" present a serious danger to the health of the bees in the hive as well as the quality of honey which they produce. "Foul brood" is a spore that affects the larvae of bees. Once a hive has been infected with foul brood, the removal of the spore from the hive is very difficult.

Another problem encountered in cleaning the frames is the removal of propropolis, which is a resinous glue which the bees obtain from trees and which they deposit on the frame. This resinous material is difficult to remove.

Recovering the bee's wax from the frames is also a desirable result. Bee's wax is valuable, and the recovery of the bee's wax from the frames produces a valuable, marketable item.

Therefore, a primary object of the present invention is the provision of an improved device for cleaning the bee hive frames.

A further object of the present invention is the provision of a device which melts the bee's wax off of the frames so that it can be recovered.

A further object of the present invention is the provision of a device which permits the recovery of the wax in a form which is marketable.

A further object of the present invention is the provision of a device which sterilizes the bee hive frames at the same time that it removes the wax from them.

A further object of the present invention is the provision of a device which renders the propropolis into a form which is crystallized and which is easily removed from the frames.

A further object of the present invention is the provision of a device which sterilizes the frame so that diseases such as foul brood cannot infect the hive.

A further object of the present invention is the provision of a device which renders the cappings from bee hive frames.

A further object of the present invention is the provision of a device which can also be used to liquify 60 pound cans of honey.

Another object of the present invention is the provision of a device which is economical to manufacture, durable in use and efficient in operation.

SUMMARY OF THE INVENTION

The present invention comprises an oven box for melting the wax off the bee hive frames so as to clean them and reclaim the wax. The oven comprises a rectangular box having an inclined plate therein. Below the plate is a heating element which heats the interior of the oven for melting the wax. Hangers are provided on the interior of the oven for suspending a plurality of bee hive frames above the inclined plate. The hangers are positioned so that the frames hang in an inclined orientation so as to permit the wax to run downwardly toward the lower end of the inclined plate and thereby provide more complete removal of the wax.

A drain is provided in the bottom end of the inclined plate and is covered with a screen. The wax is permitted to go through the screen and outwardly through the drain where it may be recovered.

A heating element is provided below the plate for heating the interior of the oven to a temperature which causes the wax to melt and run off of the frames and down through the drain. A thermostat is also provided within the interior of the box so as to control the heating element and maintain the temperature at the desired level.

The loose matter and extraneous fibers and other impurities which are within the wax are screened out by the screen so that only the wax is permitted to pass through the screen and the drain.

The device will clean frames which have old honey combs thereon within approximately 2½ to 3 hours when it is operated at a temperature of 200° F. to 250° F. The wax is ready for selling when it is recovered from the drain.

Because the heat within the oven is dry heat, the frames do not become warped or misshapen. In prior devices, steam cleaning was used and the frames often became warped and unusable.

If desired, the oven temperature can be elevated to as high as 300° F. to provide a good sterilization of the frames. Furthermore, instead of using frames, it is possible to place 60 pound cans of honey into the oven to permit the honey to be liquified.

DETAILED DESCRIPTION OF THE PREFERRED EMBODIMENT

Figure 1:
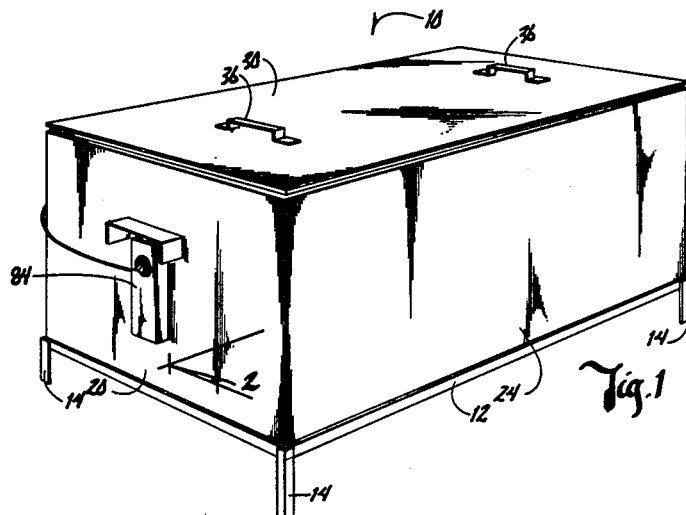
FIG. 1 is a perspective view of the present invention.
Figure 6:
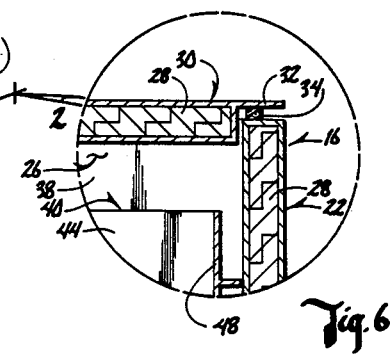
FIG. 6 is a detailed enlarged view of the portion enclosed within line 6—6 of FIG. 2.

Referring to the drawings, the numeral 10 generally designates the device or oven of the present invention. Device 10 comprises a rectangular support frame 12 having four legs 14 for engaging the floor or supporting surface. An insulated box 16 is comprised of an insulated floor wall 18, a pair of opposite end walls 20, 22, a front wall 24, and a rear wall 26. All of the walls 18, 20, 22, 24, 26 are insulated and include an insulating material 28 therein. A top wall or lid 30 is similarly provided with insulating material 28. Top wall 30 includes a horizontal flange 32 (FIG. 6) having a sealing member 34 extending around the perimeter of lid 30 for engaging and sealing against the upper edges of walls 20, 22, 24, 26. Top wall 30 is also provided with a pair of handles 36 for removing lid 30. When lid 30 is in place it encloses a compartment 38 within box 16.

Mounted within insulated box 16 is in interior box 40. Box 40 is comprised of an inclined plate 42 which forms the bottom wall thereof, a pair of opposite side plates 44, an upper end plate 46 and a lower end plate 48. A pair of inclined angle members 50 are attached to the interior surfaces of front wall 24 and rear wall 26 and provide support for the inclined plate 42. Plates 44, 46 and 48 are spaced inwardly from the interior surfaces of front wall 24, rear wall 26 and end walls 20, 22 so as to permit air to circulate around interior box 40 within compartment 38. A divider wall 52 spans the distance between opposite side plates 44 and includes a horizontal T-flange 54 on its upper edge. Also, a horizontal flange 56 is provided on the interior surface of upper end plate 46. Similarly, a horizontal flange 58 is provided on the interior surface of lower end plate 48. Flanges 54, 56 and 58 are in a line with one another, but this line is inclined slightly with flange 56 being at the upper end of the line and flange 58 being at the lower end of the line.

Figure 2:
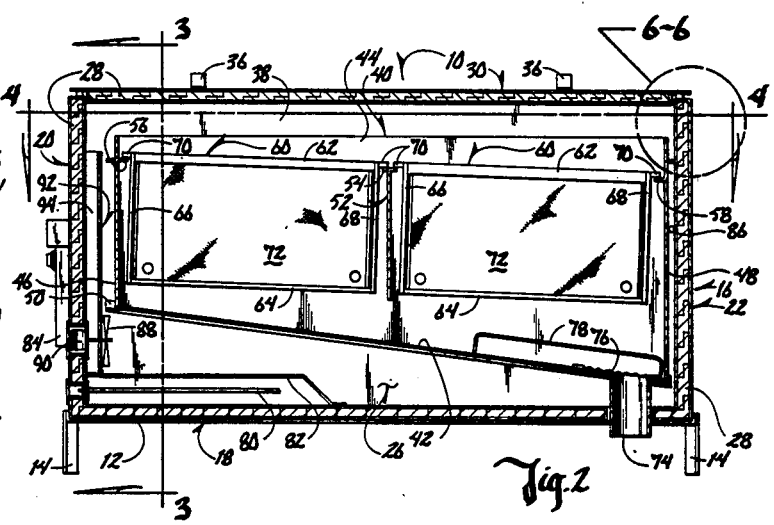
FIG. 2 is a sectional view taken along line 2—2 of FIG. 1.
Figure 5:
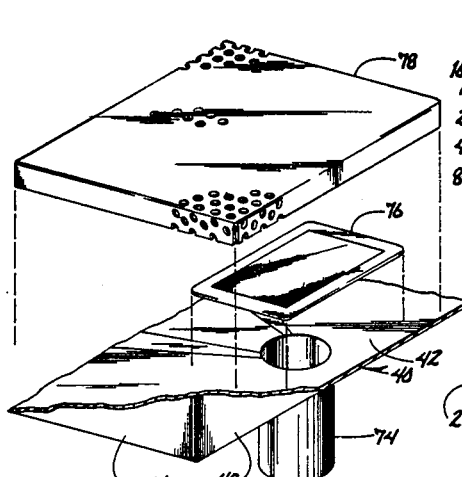
FIG. 5 is an exploded perspective view of the drain of the present invention.
Figure 4:
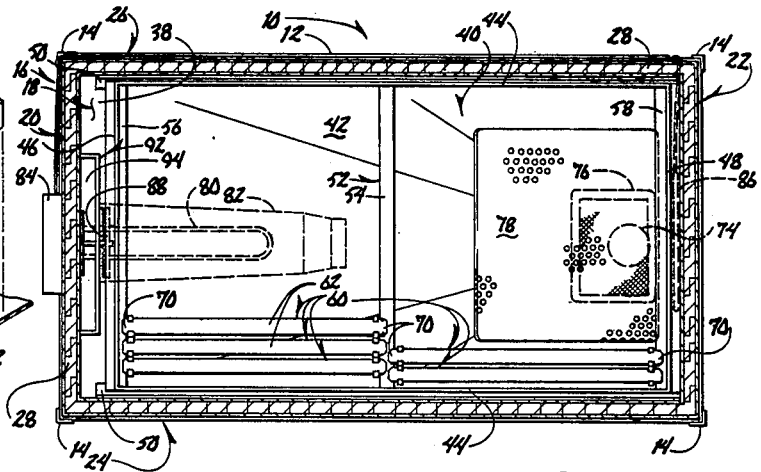
FIG. 4 is a sectional view taken along line 4—4 of FIG. 2.

Flanges 54, 56 and 58 are used to suspend conventional bee hive frames 60 about inclined plate 42. Each frame 60 comprises upper and lower horizontal members 62, 64 and opposite end members 66, 68. Each upper member 62 includes an outwardly extending flange 70 which is adapted to engage and rest upon the flanges 54, 56 and 58, all as shown in FIG. 2. Each frame 60 also includes a wax sheet 72 or a plastic sheet coated with wax. It is upon this wax sheet 72 that the bees build their honey comb, with the honey comb extending outwardly from opposite sides of the sheet 72 at an approximately perpendicular angle.

Adjacent the lower end of inclined plate 42 is a drain 74 which extends downwardly through bottom wall 18 so as to provide communication from above plate 42 to the exterior of device 10. Fitted over drain 74 is a fine screen 76, and over this fine screen 76 is a primary screen 78. Screen 78 screens out the larger particles in the wax, and screen 76 screens out the smaller particles. The screens 76, 78 are sufficiently large to permit the melted wax to pass therethrough and outwardly through the drain 74.

A heating element 80 is provided in the lower portion of device 10 within compartment 38. Heating element 80 is covered by a protective plate 82. Connected to heating element 80 is a thermostat control 84 which is located outside device 10. Control 84 is connected to a temperature sensor 86 within compartment 38 so that the control 84 is responsive to the temperature within compartment 38 to determine whether or not heating element 80 should be turned on or off.

Also mounted within compartment 38 is an air circulation fan 88 which is driven by an electric motor 90. Fan 88 is connected to a manifold 92 which is used to provide better circulation of the air within the chamber 38. Manifold 92 forms a duct 94 for carrying the air from fan 88. When fan 88 is operated in one direction, air is forced upwardly through duct 94. Alternatively, fan 88 may be reversed to draw air downwardly through duct 94. The primary function of duct 94 and fan 88 is to permit the air to be circulated throughout the chamber 38 so as to provide even heat distribution.

Figure 3:
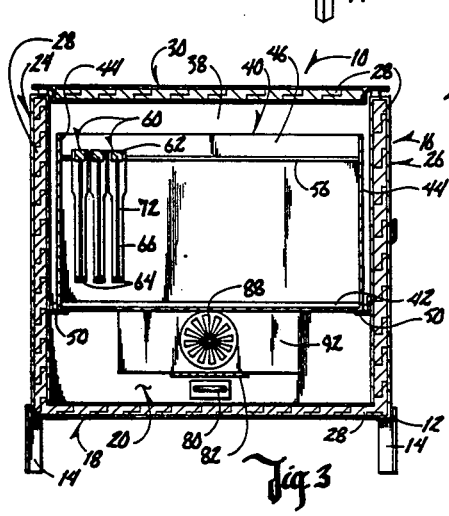
FIG. 3 is a sectional view taken along line 3—3 of FIG. 2.

In operation, the frames 60 are suspended within chamber 38 in the manner shown in FIGS. 2 and 3. Lid 30 is placed on the device and heating element 80 is actuated. Preferably the temperatures will be raised to approxiately 200°–250° F. within chamber 38. These temperatures cause the wax to melt off of the frames 60 and to drip downwardly onto inclined plate 42. Because of the incline of plate 42, the wax runs downwardly towards drain 74, through screens 78, 76 and outwardly through drain 74. The impurities and foreign matter in the wax are captured by the screens 76, 78.

The frames 60 are surrounded by dry air, and therefore they do not tend to become warped or swollen as is the case with conventional steam cleaning equipment. Furthermore, because the frames are slightly inclined, the wax runs off the frames downwardly towards the drain 74. The heat within the oven 10 can be increased to such a level that it will kill all of the spores on the frames and all bacteria and other contaminating forms of life which may be present on the frames. The result is a sterilized group of frames which can be reused in the hive without fear of infecting the hive with some disease.

Another use for the present invention would be to place large cans of honey therein so that the honey can be heated and liquified in the event that it should become crystallized.

Many frames become black and darkened after extensive use, and the present invention permits these frames to be cleaned so that they can be used again. The propropolis which is placed on the frames by the bees can be easily removed because the heat causes it to crystallize and become brittle so that it can easily be removed from the frames.

Thus, it can be seen that the device accomplishes at least all of its stated objectives.

What is claimed is:

1. A device for cleaning rectangularly shaped bee hive wax frames comprising:
   an insulated box having sidewalls, a top wall, and a bottom wall defining a heating compartment, said bottom wall having a drain opening therein providing communication from the interior to the exterior of said heating compartment,
   a ramp wall mounted within said compartment and dividing said compartment into upper and lower portions, said ramp wall being inclined from an upper end towards a lower end; said lower end being said drain opening;
   drain means extending through said lower end of said ramp wall and through said drain opening;
   hanger means above said ramp wall for suspending a plurality of said bee hive frames within said upper portion of said compartment;
   a heating element within said compartment for heating the air within said compartment to a temperature at least sufficient to melt said wax on said frames whereby said wax will melt, run down said ramp wall and through said drain means;
   said ramp wall comprising ramp wall side edges and opposite ramp wall end edges;
   a pair of inner side walls and a pair of inner end walls extending upwardly from said ramp wall side edges and end edges respectively to define an interior box which is spaced inwardly from said side walls and said bottom wall of said insulated box;
   said hanger means comprising spaced apart horizontal flanges mounted within said interior box, said frames having a pair of flanges protruding outwardly from the opposite rectangular ends thereof for engaging said horizontal flanges to suspend said frames within said interior box.

2. A device according to claim 1 wherein a thermostat is mounted within said compartment and is connected to said heating element for controlling the temperature within said compartment.

3. A device according to claim 1 wherein said compartment is filled with air and is substantially free from water.

4. A device according to claim 3 wherein an air circulator is within said compartment for causing the air to move continuously therein.

5. A device according to claim 1 wherein said hanger means are positioned within said compartment so as to permit a plurality of said frames to be suspended in a plurality of vertically oriented planes.

6. A device according to claim 5 wherein each of said frames include an upper rectangular edge, a lower rectangular edge, and two opposite rectangular edges, said hanger means being positioned to hold said frames in a position wherein said upper and lower rectangular edges are inclined to facilitate the running of melted wax off said frame.

7. A device for cleaning rectangularly shaped bee hive wax frames comprising:
   an insulated box having sidewalls, a top wall, and a bottom wall defining a heating compartment, said bottom wall having a drain opening therein providing communication from the interior to the exterior of said heating compartment;
   a ramp wall mounted within said compartment and dividing said compartment into upper and lower portions, said ramp wall being inclined from an upper end towards a lower end; said lower end being said drain opening;
   drain means extending through said lower end of said ramp wall and through said drain opening;
   hanger means above said ramp wall for suspending a plurality of bee hive frames within said upper portion of said compartment;
   a heating element within said compartment for heating the air within said compartment to a temperature at least sufficient to melt said wax on said frames whereby said wax will melt, run down said ramp wall and through said drain means;
   said compartment being filled with air and being substantially free from water;
   said frames each including an upper rectangular edge, a lower rectangular edge, and two opposite rectangular edges;
   said hanger means being positioned to hold said frames in a position wherein each frame is suspended in a vertical plane and wherein said upper and lower rectangular edges of each of said frames are inclined to facilitate the running of melted wax off said frames.

8. A device according to claim 9 wherein screen means are fitted over said drain means to prevent foreign materials within said wax from going through said drain means while at the same time permitting said wax to pass through said screen means and said drain means.

9. A device for cleaning rectangularly shaped bee hive wax frames comprising:
   an insulated box having sidewalls, a top wall, and a bottom wall defining a heating compartment, said bottom wall having a drain opening therein providing communication from the interior to the exterior of said heating compartment,
   a ramp wall mounted within said compartment and dividing said compartment into upper and lower portions, said ramp wall being inclined from an upper end towards a lower end; said lower end being said drain opening;
   drain means extending through said lower end of said ramp wall and through said drain opening;
   hanger means above said ramp wall for suspending a plurality of said bee hive frames within said upper portion of said compartment;
   a heating element within said compartment for heating the air within said compartment to a temperature at least sufficient to melt said wax on said frames whereby said wax will melt, run down said ramp wall and through said drain means;
   said compartment being filled with air and being substantially free from water;
   a thermostat mounted within said compartment and connected to said heating element for controlling the maximum air temperature within said compartment to a range of from 200° F. to 300° F.

10. A device according to claim 9 wherein a first screen and a second screen are mounted in covering relation over said drain means to prevent foreign materials within said wax from going through said drain means while at the same time permitting said wax to pass through said first and second screens and said drain means.

* * * * *